March 10, 1959  J. T. RISSE  2,877,007
DRUM FOR ROTARY KILN
Filed Jan. 5, 1956
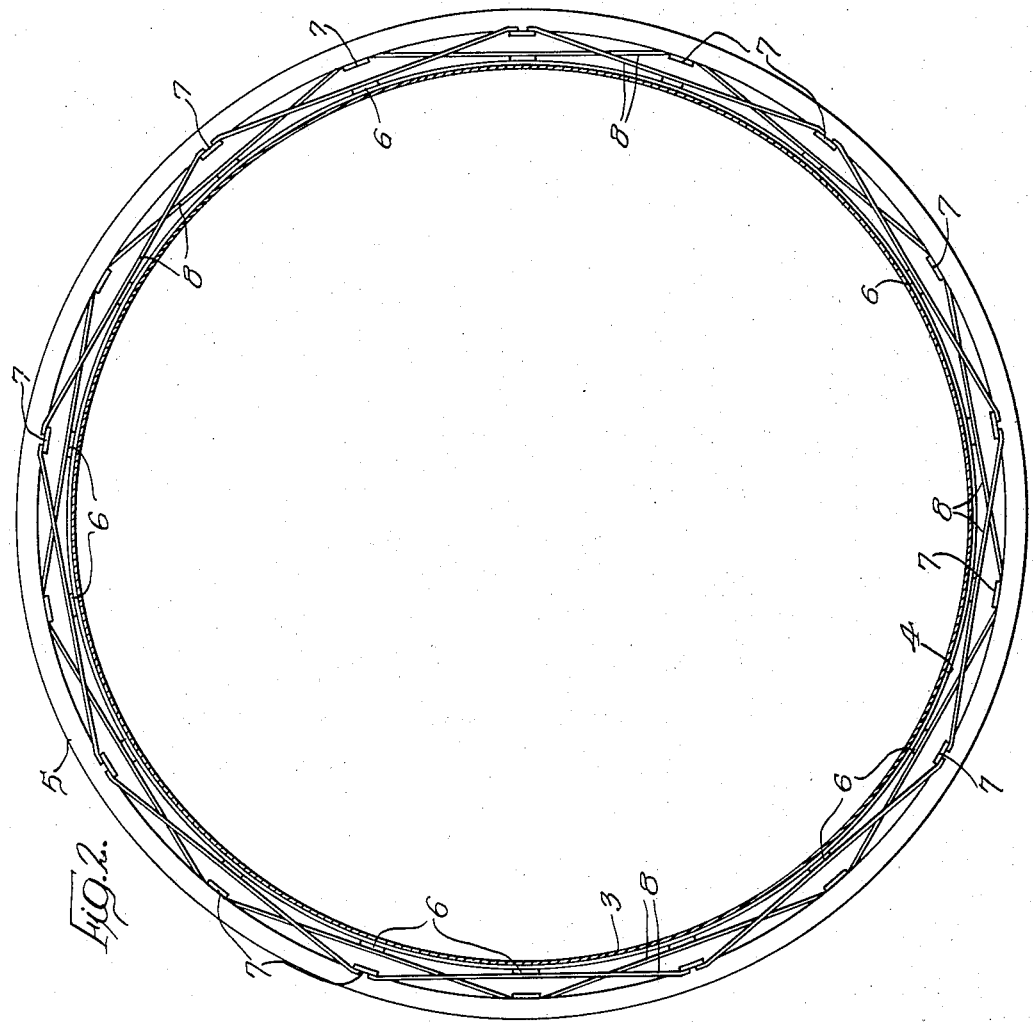
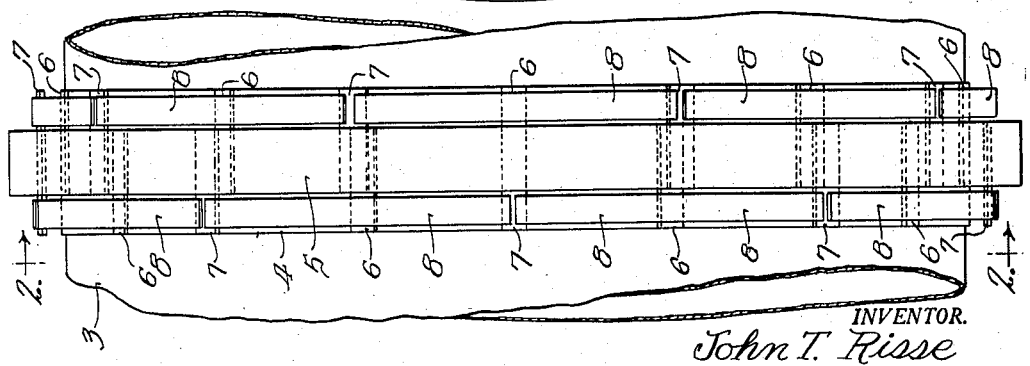
INVENTOR.
John T. Risse
BY
Brown, Jackson, Boettcher & Dienner.
Attys.

United States Patent Office 2,877,007
Patented Mar. 10, 1959

2,877,007

DRUM FOR ROTARY KILN

John T. Risse, Davenport, Iowa, assignor to Iowa Manufacturing Company of Cedar Rapids, Cedar Rapids, Iowa, a corporation of Iowa Application January 5, 1956, Serial No. 557,539

3 Claims. (Cl. 263—33)

This invention relates to rotary kilns and has to do with rotary drums for use in such kilns and with the mounting of the tires on the drum.

Rotary kiln drums are used for various purposes, such as the drying of aggregates for use in road surfacing operations, the burning of clinker in cement making processes, and analogous operations. The drum is rotated about its axis by suitable known means and is commonly supported for rotation on tires mounted on the drum and resting upon trunnion rollers. In many cases the drum is subjected to comparatively high temperatures and it is important that expansion and contraction of the drum be accommodated in a manner to avoid subjecting it to objectionably high and injurious stresses. It is also of importance that the drum, which with its contained load of material is quite heavy, be supported in such manner that it may rotate freely without being subjected to objectionable mechanical stresses.

My invention is directed to means for mounting the tires on a rotary kiln drum in such manner that expansion and contraction of the drum are readily accommodated without subjecting the drum to undesirable stresses and the drum may be freely rotated. To that end I connect the respective tires to the drum by members which at all times function as tension members effective for maintaining the tire in concentric spaced relation to the drum and are flexible for accommodating relative expansion and contraction of the tire and the drum without subjecting either thereof to objectionable stresses. The tension members and associated parts are so related that they may be fabricated with expedition and facility and are so disposed that the tire is maintained in proper relation to the drum and is effectively restrained against relative displacement or tilting, assuring that the drum is supported so as to rotate freely and is not subjected to objectionable mechanical stresses. Further objects and advantages of my invention will appear from the detail description.

In the drawings:

Figure 1 is a fragmentary side view of a rotary kiln drum embodying my invention; and Figure 2 is a sectional view taken substantially on line 2—2 of Figure 1.

Drum 3 is constructed of heavy boiler plate in a suitable known manner. It is provided at suitable intervals with an exterior band 4, also of boiler plate, secured tightly about drum 3 by welding or in any suitable known manner. A steel tire 5 of suitable thickness and substantial width is disposed about band 4, which may have a width approximately twice that of tire 5. The latter is centered relative to band 4 and is disposed in concentric spaced relation thereto and to drum 3. A plurality of flat oblong plates 6 are secured in a suitable known manner, conveniently by welding, to the outer face of band 4 transversely thereof and are spaced uniformly thereabout. The plates 6 are disposed to project alternately a substantial distance beyond the opposite sides of tire 5 with their outer ends preferably, though not necessarily, flush with the edges of band 4. A plurality of plates 7, similar to plates 6, are secured in a suitable known manner, conveniently by welding, to the inner face of tire 5 transversely thereof and uniformly spaced thereabout. The plates 7 preferably are aligned radially of drum 3 with plates 6 and are disposed to project alternately a substantial distance beyond the opposite sides of tire 5. Each of the plates 7 projects a substantial distance beyond one side only of tire 5, the remaining portion of plate 7 preferably being disposed within the width of tire 5 with its inner end flush with the corresponding side of tire 5, or substantially so. That avoids any objectionable projection of plate 7 beyond the side of tire 5 opposite the side thereof at which plate 7 projects to the desired substantial extent.

The projecting end portions of the plates 6 and 7 are connected together at opposite sides of the tire 5 by flat steel strips 8 of elongated rectangular or oblong shape in plan. Each of the strips 8 is secured at its ends in a suitable known manner, conveniently by welding, to the projecting end portions of two successive plates 7 and is also secured at its midlength in a suitable known manner, conveniently by welding, to the projecting end portion of a plate 6 midway between the two plates 7. The strips 8 are thus disposed substantially chordally of tire 5 and tangent to drum 3. The strips 8 at each side of the tire 5 are staggered relative to the strips at the other side of tire 5 providing a continuous lattice work structure effective for supporting the tire 5 in substantially concentric spaced relation to the drum 3. Strips 8 support the weight of the drum and the contents thereof and may readily be flexed transversely to accommodate relative expansion of the drum and the tire. Further, the strips 8 are tension members which function under endwise tension at all times thus avoiding bending or buckling of the strips such as would be apt to occur if they were subjected to endwise compressive stresses. A further advantage resulting from the use of the strips 8 disposed as shown is that the strips function to large extent as springs providing a spring mounting for the drum capable of accommodating radial movement thereof relative to the tire in the event of sudden shifting of the material within the drum, while also cushioning any jarring of the drum which may occur and reducing resultant stresses to a minimum. The strips 8 and associated parts thus normally maintain the tire 5 in concentric spaced relation to the drum 3 and are also highly efficient as shock absorbing means and for guarding against subjecting the drum to objectionable mechanical stresses while accommodating expansion and contraction thereof due to temperature variations.

The drum illustrated, by way of example, is intended for use in a kiln for drying aggregates and other materials. In practice the drum may be provided with interior flights for elevating and discharging the material during rotation of the drum. The showing of such flights is not necessary to an understanding of the instant invention and has been omitted for clearness of illustration. Alternatively, the drum may be provided with a refractory lining, if it is to be used in a kiln for burning clinker in cement making processes, or for other purposes involving the use of comparatively high temperatures. The drum of my invention may be used for various purposes, as has been indicated, the interior construction of the drum depending upon its intended use.

It will be understood that changes in detail may be resorted to without departing from the field and scope of my invention, and I intend to include all such variations, as fall within the scope of the appended claims in this application in which the preferred form only of my invention has been disclosed.

I claim:

1. In a kiln, a rotary drum, a tire of substantial width concentric with and spaced from said drum exteriorly thereof, and a plurality of flexible tension members at each side of said tire disposed substantially chordally thereof and respectively fixedly secured at their ends to said tire and thereby restrained against endwise movement relative to the latter, said members being substantially tangent to said drum and respectively fixedly secured thereto at their midlength, the ends of the tension members at each side of the tire being substantially aligned transversely of said tire with the midlength of the tension members at the other side of the tire whereby the tension members at each side of said tire are staggered relative to the tension members at the other side thereof, said tension members maintaining said tire and drum in substantially concentric spaced relation while accommodating relative expansion and contraction thereof.

2. In a kiln, a rotary drum, a tire of substantial width concentric with and spaced from said drum exteriorly thereof, a plurality of flat plates secured to the radially inner face of said tire transversely thereof and uniformly spaced circumferentially of said tire, said plates projecting beyond the sides of said tire, and a plurality of flat flexible tension members of elongated rectangular shape in plan at each side of said tire disposed substantially chordally thereof with their ends respectively seating on and secured to said plates, said members being substantially tangent to said drum and respectively secured thereto at their midlength, said tension members maintaining said tire and drum in substantially concentric spaced relation while accommodating relative expansion and contraction thereof.

3. In a kiln, a rotary drum, a tire of substantial width concentric with and spaced from said drum exteriorly thereof, a plurality of flat plates secured to the radially inner face of said tire transversely thereof and uniformly spaced circumferentially of said tire, said plates projecting beyond the sides of said tire, and a plurality of flat flexible tension members of elongated rectangular shape in plan at each side of said tire disposed substantially chordally thereof with their ends respectively seating on and secured to said plates, said members being substantially tangent to said drum and respectively secured thereto at their midlength, the tension members at each side of said tire being staggered relative to the tension members at the other side thereof, said tension members maintaining said tire and drum in substantially concentric spaced relation while accommodating relative expansion and contraction thereof.

References Cited in the file of this patent
UNITED STATES PATENTS

| | | |
|---|---|---|
| 1,188,567 | Singer | June 27, 1916 |
| 1,240,951 | Davis | Sept. 25, 1917 |
| 2,192,912 | Howie | Mar. 12, 1940 |